(No Model.)
W. H. WILDER.
WICK TUBE FOR OIL BURNERS.
No. 354,367. Patented Dec. 14, 1886.
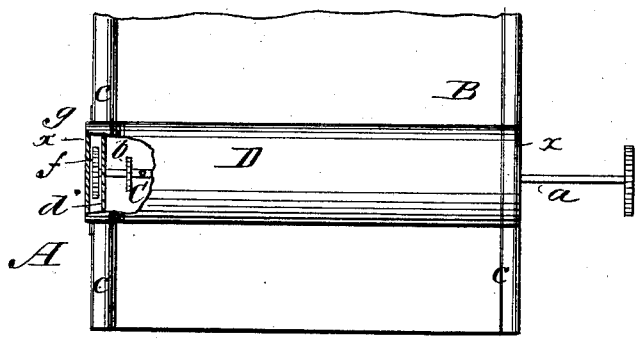
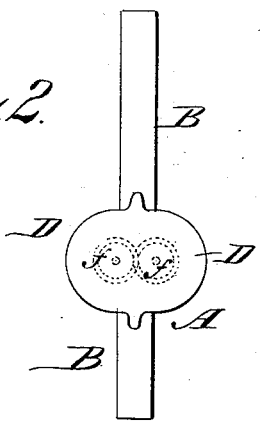
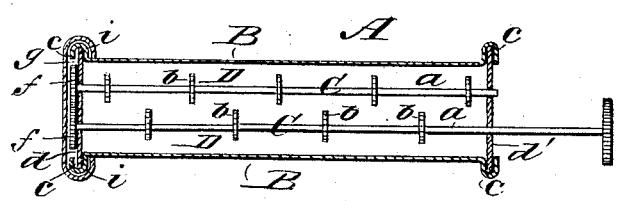
WITNESSES:
INVENTOR:
W. H. Wilder
BY
ATTORNEYS.

UNITED STATES PATENT OFFICE.

WILLIAM H. WILDER, OF GARDNER, MASSACHUSETTS, ASSIGNOR TO THE AMERICAN OIL STOVE COMPANY, OF SAME PLACE.

WICK-TUBE FOR OIL-BURNERS.

SPECIFICATION forming part of Letters Patent No. 354,367, dated December 14, 1886.

Application filed December 30, 1885. Serial No. 187,087. (No model.)

*To all whom it may concern:*

Be it known that I, WILLIAM H. WILDER, of Gardner, in the county of Worcester and State of Massachusetts, have invented a new and Improved Wick-Tube for Oil-Stoves, of which the following is a full, clear, and exact description.

My invention relates to a novel construction of wick-tube and to an arrangement of wick-raisers, whereby the wicks may be uniformly raised throughout their width, the wick-tube being so constructed as not to be injuriously affected by the heat to which it is necessarily subjected.

The invention consists more particularly of a peculiar and novel arrangement for the support of the spindles of the wick-raisers and of an arrangement whereby the intermeshing gears carried by said spindles are inclosed and protected.

Reference is to be had to the accompanying drawings, forming a part of this specification, in which similar letters of reference indicate corresponding parts in all the figures.

Figure 1 is a side view of my improved wick-tube, a portion of the casing being cut away to disclose the interior construction. Fig. 2 is an end view of the same, and Fig. 3 is a sectional plan view taken on line $x\ x$ of Fig. 1.

The wick-chamber A is of ordinary construction, except that in each side plate, B, there is formed a recess, D, within which the wick-raisers C are mounted, said raisers, as usual, consisting of a shaft, $a$, upon which there are mounted wick-raising wheels $b\ b$. Upon each end of the plates B, at the points where they are bent outward to form the recess D, the plates are bent up to form the groove $c$, within which there are placed head-pieces $d\ d'$, and in these head-pieces I form bearings for the shafts of the wick-raisers. These shafts project through the head $d$ and carry intermeshing gears $f f$ upon their projecting ends, from which construction it will be seen that the raising-wheels $b$ may be located in close proximity to the head-pieces. In order that the gear $f f$ may be protected and the various parts forming the wick-chamber firmly united, I provide an inclosing-cap, $g$, which is fitted over the ridges $i\ i$, which are turned up to form the groove $c$, the various parts being firmly clamped together, and such simple clamping is all that is actually necessary to hold the parts together; but, in order that a perfectly-tight joint may be insured, I prefer to close the seam by solder.

Although I have described the chamber as being provided with two heads, $d$ and $d'$, it will of course be understood that the end closed by the head $d'$ could be closed in any other way desired, the main feature of the invention being the arrangement of the head $d$, which acts as a bearing for the spindles of the wick-raisers, and the arrangement of the gears $f f$ outside of the head $d$, the parts being protected and bound together by a cap, $g$.

Having thus fully described my invention, what I claim as new, and desire to secure by Letters Patent, is—

1. The combination, with the side plates, B B, formed with the grooves $c\ c$, of a head-piece, $d$, in said grooves, the wick-raising spindles projecting through the head-piece, intermeshing gears on the said ends, and a cap, $g$, inclosing said gears, substantially as shown and described.

2. The combination, with the side plates, B B, bent to form the recesses D D, and ridges $i\ i$, forming grooves $c\ c$, the head-pieces $d\ d'$ in said grooves, the spindles $a\ a$, mounted in the heads and projecting through the head $d$, the intermeshing gears $f$ on the said ends, and the cap $g$, fitted over the ridges $i\ i$ and inclosing the gears, substantially as set forth.

3. In a wick-chamber, the combination, with the side plates of the chamber, of a head-piece, wick-raisers C C, provided with gears $f f$, and a cap, $g$, substantially as described.

WILLIAM H. WILDER.

Witnesses:
 THATCHER B. DUNN,
 JULIAN P. DUNN.